US012798393B2

(12) United States Patent
Isami et al.

(10) Patent No.: US 12,798,393 B2
(45) Date of Patent: Nov. 17, 2026

(54) ELECTRIC VEHICLE

(71) Applicant: TOYOTA JIDOSHA KABUSHIKI KAISHA, Toyota (JP)

(72) Inventors: Yoichiro Isami, Mishima (JP); Ryohei Yuasa, Okazaki (JP); Yushi Higashiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/052,718

(22) Filed: Feb. 13, 2025

(65) Prior Publication Data

US 2025/0262950 A1 Aug. 21, 2025

(30) Foreign Application Priority Data

Feb. 15, 2024 (JP) ................................ 2024-021327

(51) Int. Cl.

*B60L 15/20* (2006.01)
*B60K 35/28* (2024.01)
*B60W 50/14* (2020.01)

(52) U.S. Cl.

CPC .............. *B60L 15/20* (2013.01); *B60K 35/28* (2024.01); *B60W 50/14* (2013.01); (Continued)

(58) Field of Classification Search

CPC ............... B60L 15/20; B60L 2240/423; B60L 2250/16; B60L 2250/24; B60L 2250/26; (Continued)

(56) References Cited

U.S. PATENT DOCUMENTS

2009/0288636 A1 11/2009 Saito et al.
2015/0199955 A1* 7/2015 Draganic ................ G08B 6/00 381/86

(Continued)

FOREIGN PATENT DOCUMENTS

DE 102013202951 A1 * 8/2013 ........... B60W 20/00
JP 2001-185189 A 7/2001

(Continued)

*Primary Examiner* — Rodney A Butler

(74) *Attorney, Agent, or Firm* — Finnegan, Henderson, Farabow, Garrett and Dunner, LLP

(57) ABSTRACT

The present disclosure provides an electric vehicle having an electric motor as a drive source. The electric vehicle comprises an accelerator pedal, a dummy gear shift operation member that simulates an operation member, a display device, a vehicle speed sensor, and a control device configured to control torque of the electric motor in accordance with operation of the accelerator pedal. The control device executes switching a relationship of the torque of the electric motor with respect to an operation amount of the accelerator pedal and the vehicle speed in accordance with operation of the dummy gear shift operation member, displaying an indicator on the display device, the indicator continuously changing content in conjunction with driving wheel torque of the electric vehicle and the vehicle speed, and notifying the driver of a timing at which the operation of the dummy gear shift operation member is recommended by the indicator.

6 Claims, 9 Drawing Sheets

(52) U.S. Cl.
CPC ..... *B60L 2240/423* (2013.01); *B60L 2250/16* (2013.01); *B60L 2250/24* (2013.01); *B60L 2250/26* (2013.01); *Y02T 10/72* (2013.01)

(58) Field of Classification Search
CPC ............ B60L 15/2054; B60L 2220/42; B60L 2240/12; B60L 2240/421; B60L 2250/10; B60W 2520/10; B60W 2520/30; B60W 50/14; B60W 2050/146; B60K 35/21; B60K 35/213; B60K 2360/131; B60K 35/10; B60K 35/28; B60K 2360/167; B60K 2360/188; Y02T 10/72
See application file for complete search history.

(56) References Cited

U.S. PATENT DOCUMENTS

| | | | | |
|---|---|---|---|---|
| 2019/0225221 | A1 | 7/2019 | Higa | |
| 2022/0041155 | A1* | 2/2022 | Isami ..................... | B60K 17/02 |

FOREIGN PATENT DOCUMENTS

| | | | |
|---|---|---|---|
| JP | 2008-174150 | A | 7/2008 |
| JP | 2012-001185 | A | 1/2012 |
| JP | 2021-151168 | A | 9/2021 |
| JP | 6947051 | B2 | 10/2021 |
| JP | 2021-179688 | A | 11/2021 |
| JP | 2022-36844 | A | 3/2022 |

* cited by examiner

ELECTRIC VEHICLE

CROSS-REFERENCE TO RELATED APPLICATION

The present application claims priority under 35 U.S.C. § 119 to Japanese Patent Application No. 2024-021327, filed on Feb. 15, 2024, the contents of which application are incorporated herein by reference in their entirety.

BACKGROUND

Field

The present disclosure relates to an electric vehicle having an electric motor as a drive source.

Background Art

Patent Document 1 discloses a hybrid vehicle including a meter display device that can be switched from a power meter display to a tachometer display by operating a switch.

Patent Document 1: Japanese Patent No. 6947051

SUMMARY

An electric vehicle is known which can simulate the behavior of a vehicle including a manual transmission (transmission vehicle) using an engine as a power source by controlling an electric motor. In the electric vehicle, switching of the gear stage in the transmission vehicle is also reproduced, and a driver can manually perform a virtual gear shift operation. In such a vehicle, it is considered to notify the driver of a timing of the gear shift operation in an easy-to-understand manner.

An object of the present disclosure is to provide a technique capable of visually notifying a driver of a timing of virtually reproduced switching of a gear stage in an electric vehicle capable of reproducing a behavior of a transmission vehicle.

The present disclosure provides an electric vehicle having an electric motor as a drive source. The electric vehicle comprises an accelerator pedal used for driving the electric vehicle, a dummy gear shift operation member that simulates an operation member used for gear shift operation of a transmission vehicle, a display device for displaying information to a driver, a vehicle speed sensor configured to measure a vehicle speed of the electric vehicle, and a control device configured to control torque of the electric motor in accordance with operation of the accelerator pedal. The control device is configured to execute switching a relationship of the torque of the electric motor with respect to an operation amount of the accelerator pedal and the vehicle speed in accordance with operation of the dummy gear shift operation member, displaying an indicator on the display device, the indicator continuously changing content in conjunction with driving wheel torque of the electric vehicle and the vehicle speed, and notifying the driver of a timing at which the operation of the dummy gear shift operation member is recommended by the indicator.

According to the electric vehicle of the present disclosure, the timing at which the virtual gear shift operation by the dummy gear shift operation member is recommended is notified by the indicator displayed on the display device. The display of the indicator continuously changes in accordance with a state of the vehicle. The timing at which the gear shift operation is recommended is not singly notified but is notified by the display that continuously changes in accordance with the state of the vehicle, and thus the driver can visually recognize the timing of the gear shift operation in an easily understandable manner.

DETAILED DESCRIPTION

Embodiments of the present disclosure will be described with reference to the accompanying drawings.

1. Configuration of Power System of Electric Vehicle

Figure 1:
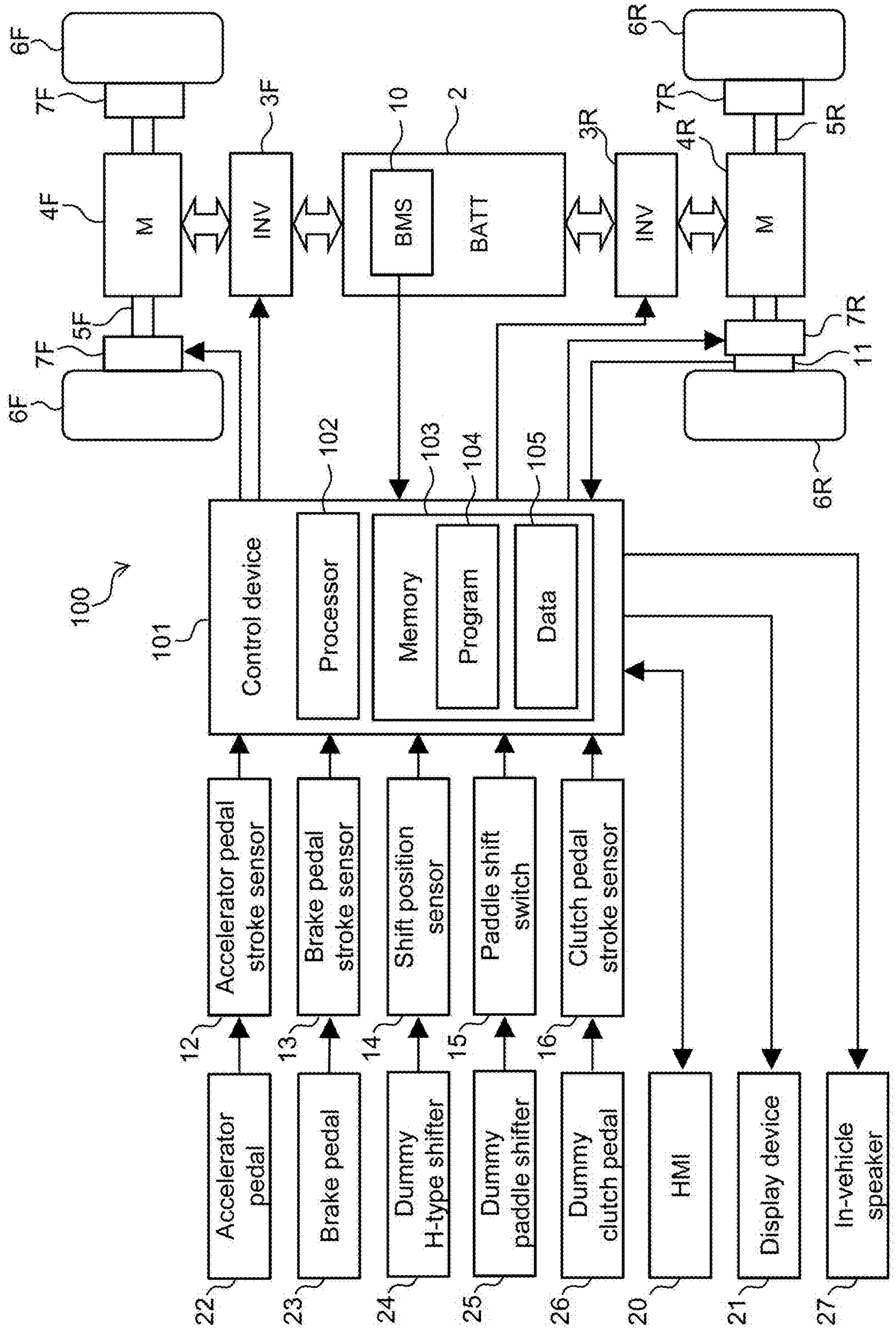
FIG. 1 is a diagram showing a configuration of an electric vehicle according to an embodiment of the present disclosure.

FIG. 1 is a diagram schematically showing a configuration of an electric vehicle 100 according to an embodiment of the present disclosure. First, a configuration of a power system of the electric vehicle 100 is described with reference to FIG. 1.

The electric vehicle 100 includes two electric motors (M) 4F and 4R as power sources for driving. The electric motors 4F and 4R are arranged at the front and the rear, respectively. The electric motors 4F, 4R are, for example, three phase alternating current motors. The front electric motor 4F is connected to a front drive shaft 5F, which drives front wheels 6F. The rear electric motor 4R is connected to a rear drive shaft 5R, which drives rear wheels 6R. The front wheels 6F are suspended by front suspension 7F, in which the right and left can be controlled independently and electronically. The rear wheels 6R are suspended by rear suspension 7R, in which the right and left can be controlled independently and electronically.

Inverters (INV) 3F and 3R are attached to the front electric motor 4F and the rear electric motor 4R, respectively. The front inverter 3F and the rear inverters 3R are connected to a battery (BATT) 2. The battery 2 stores electric energy for driving the electric motors 4F and 4R. That is, the electric vehicle 100 is a battery electric vehicle (BEV), which drives using electric energy stored in the battery 2. The inverters 3F and 3R are, for example, voltage-type inverters and control torque of the electric motors 4F and 4R by PWM control.

2. Configuration of Control System of Electric Vehicle

Next, a configuration of a control system of the electric vehicle 100 is described with reference to FIG. 1.

The electric vehicle 100 includes a battery management system (BMS) 10. The battery management system 10 is an apparatus which monitors cell voltage, electric current, temperature, and the like of the battery 2. The battery management system 10 has a function of estimating a state of charge (SOC) of the battery 2.

The electric vehicle 100 includes a vehicle speed sensor 11. At least one of wheel speed sensors (not shown in Figs.) provided on the right and left front wheels 6F and the right and left rear wheels 6R is used as the vehicle speed sensor 11. The electric vehicle 100 includes an accelerator pedal stroke sensor 12. The accelerator pedal stroke sensor 12 is provided on an accelerator pedal 22 and outputs a signal indicating an accelerator position, that is, an operating amount of the accelerator pedal 22. Further, the electric vehicle 100 includes a brake pedal stroke sensor 13. The brake pedal stroke sensor 13 is provided on a brake pedal 23 and outputs a signal indicating a brake position, that is, an operating amount of the brake pedal 23.

The accelerator pedal 22 and the brake pedal 23 are driving operation members used for driving the electric vehicle 100. In addition to these driving operation members, the electric vehicle 100 includes a dummy gear shift operation member, which simulates an operation member used for gear shift operation of a transmission vehicle. The dummy gear shift operation members include a dummy H-type shifter 24, a dummy paddle shifter 25, and a dummy clutch pedal 26, which are described below.

The dummy H-type shifter 24 is a dummy different from an original H-type shifter. The dummy H-type shifter 24 has a structure similar to a shift stick provided on a console and can be moved along an H-shaped gate between shift positions. However, since the electric vehicle 100 does not include an actual transmission, the shift positions of the dummy H-type shifter 24 are virtual shift positions. The dummy H-type shifter 24 is provided with a shift position sensor 14. The shift position sensor 14 outputs a signal indicating a shift position selected by the dummy H-type shifter 24.

The dummy paddle shifter 25 is a dummy different from an original paddle shifter which is a kind of a sequential shifter. The dummy paddle shifter 25 has a structure similar to a shift paddle attached to a steering wheel and has a right paddle and a left paddle, which can be moved independently. The dummy paddle shifter 25 is provided with a paddle shift switch 15. The paddle shift switch 15 outputs an upshift signal when the right paddle is pulled and outputs a downshift signal when the left paddle is pulled.

The dummy clutch pedal 26 is a dummy different from an original clutch pedal. The dummy clutch pedal 26 has a structure similar to a clutch pedal provided in a conventional transmission vehicle. For example, the dummy clutch pedal 26 includes a reaction force mechanism, which generates a reaction force against pressing by a driver. A position of the dummy clutch pedal 26 when no pressing force is applied is a start position of the dummy clutch pedal 26, and the position of the dummy clutch pedal 26 when the dummy clutch pedal 26 is fully depressed is an end position of the dummy clutch pedal 26. The driver can operate the dummy clutch pedal 26 from the start position to the end position against the reaction force from the reaction force mechanism. The dummy clutch pedal 26 is provided with a clutch pedal stroke sensor 16. The clutch pedal stroke sensor 16 outputs a signal indicating an amount of operation of the dummy clutch pedal 26. Since the electric vehicle 100 does not include an actual clutch, the operation amount of the dummy clutch pedal 26, that is, a position of the dummy clutch pedal 26, is a virtual clutch operation amount.

The dummy clutch pedal 26 is a pedal type operation device operated by a foot, but a lever type operation device or a dial type operation device operated by a hand may be provided as a dummy clutch operation device. Various structures can be adopted as the dummy clutch operation device as long as the driver can operate the dummy clutch operation device from the start position to the end position against the reaction force and can feel operation feeling as if operating the clutch pedal provided in the conventional transmission vehicle using his/her foot or hand.

The electric vehicle 100 includes a human-machine interface (HMI) 20 as an interface with the driver, a display device 21, and an in-vehicle speaker 27. The HMI 20 includes a touch panel display. The HMI 20 displays information on the touch panel display and receives an input by touch operation on the touch panel display by the driver. The display device 21 is provided on, for example, a meter panel, and can display a reproduced state of a transmission vehicle on the display in an MT mode described later. The in-vehicle speaker 27 provides information to the driver by voice and can output fake engine sound described later.

The electric vehicle 100 includes a control device 101. Sensors and devices to be controlled mounted on the electric vehicle 100 are connected to the control device 101 via an in-vehicle network. The electric vehicle 100 is equipped with various sensors in addition to the battery management system 10, the vehicle speed sensor 11, the accelerator pedal stroke sensor 12, the brake pedal stroke sensor 13, the shift position sensor 14, the paddle shift switch 15, and the clutch pedal stroke sensor 16.

The control device 101 is typically an electronic control unit (ECU). The control device 101 may be a combination of a plurality of ECUs. The control device 101 includes at least a processor 102 and a memory 103. The memory 103 includes a RAM which temporarily stores data and a ROM which stores a program 104 executable by the processor 102 and various data 105 related to the program. The program 104 is configured by a plurality of instructions. The processor 102 reads the program 104 and the data 105 from the memory 103 and executes the program and the data to generate a control signal based on a signal acquired from each sensor. The control device 101 may include one processors 102 or a plurality of processors 102.

The control device 101 can control the electric vehicle 100 in various control modes. The driver can select the control mode by touching the touch panel display on the HMI 20. Specifically, when touch operation is performed on the touch panel display of the HMI 20, one or more programs 104 associated with each touch operation are read from the memory 103 and executed by the processor 102. Hereinafter, the control mode of the electric vehicle 100 performed by the control device 101, which can be selected by the driver operating the HMI 20, is described.

3. Control Mode of Electric Vehicle

The control modes of the electric vehicle 100 which can be selected by the control device 101 include an EV mode and an MT mode. The driver can select a control mode from a selection screen displayed on the touch panel display of the HMI 20.

When the EV mode is selected, the control mode of the electric vehicle 100 is switched to the EV mode. The EV mode is a mode in which the vehicle travels by controlling the electric motor with normal torque characteristics. In the EV mode, the driver can basically drive the electric vehicle 100 only by operating the accelerator pedal 22, the brake pedal 23, and a steering wheel (not shown in Figs.). In the EV mode, the gear shift operation of the dummy H-type shifter 24, the gear shift operation of the dummy paddle shifter 25, and the clutch operation of the dummy clutch pedal 26 are invalidated.

When the MT mode is selected, the control mode of the electric vehicle 100 is switched to the MT mode. The MT mode is a control mode for operating the electric vehicle 100 like a transmission vehicle. In the MT mode, the virtual shift position (gear position) is reproduced and the driver can manually perform the virtual gear shift operation.

In the MT mode, the driver may be able to select a more detailed control mode. For example, the driver may be able to select an option for a shift mode of a manual transmission reproduced in the electric vehicle 100. The shift mode includes a paddle shift mode and a stick shift mode. The paddle shift mode is a mode in which the dummy paddle shifter 25 is used for the gear shift operation. In the paddle shift mode, the gear shift operation of the dummy H-type shifter 24 is invalidated. In the paddle shift mode, operation as if a gear ratio of the manual transmission is switched is reproduced by the gear shift operation of the dummy paddle shifter 25. In a real paddle shift type manual transmission, the clutch operation is automatically performed by a robot. Therefore, in the paddle shift mode, the clutch operation of the dummy clutch pedal 26 is not required. In the paddle shift mode, the clutch operation of the dummy clutch pedal 26 is invalidated.

The stick shift mode is a mode in which the dummy H-type shifter 24 is used for the gear shift operation. In the stick shift mode, the gear shift operation of the dummy paddle shifter 25 is invalidated. In the stick shift mode, operation as if the gear ratio of the manual transmission is switched is reproduced by the gear shift operation of the dummy H-type shifter 24. In the stick shift mode, the driver may further be able to select a clutch operation mode and a clutch operation-less mode. In the real H-type shifter type manual transmission, there are a transmission in which clutch operation is performed by a driver himself and a transmission in which clutch operation is performed by a robot. When the clutch operation mode is selected, the stick shift mode is switched to a mode requiring the clutch operation of the dummy clutch pedal 26. On the other hand, when the clutch operation-less mode is selected, the clutch operation of the dummy clutch pedal 26 is invalidated and the stick shift mode is switched to a mode in which the clutch operation is not required.

The driver may further select options regarding engine characteristics, engine sound, drive mode, suspension characteristics, and the like. By appropriately combining these options, the driver can determine the characteristics of the transmission vehicle that the driver wants the electric vehicle 100 to simulate. In this way, the control mode of the electric vehicle 100 can be switched to the driver's preference by operating the touch panel display on the HMI 20.

Such a control mode switched by the driver is related to the travel control of the electric vehicle 100. In the next chapter, the travel control of the electric vehicle 100 by the control device 101 will be described.

4. Travel Control of Electric Vehicle

Figure 2:
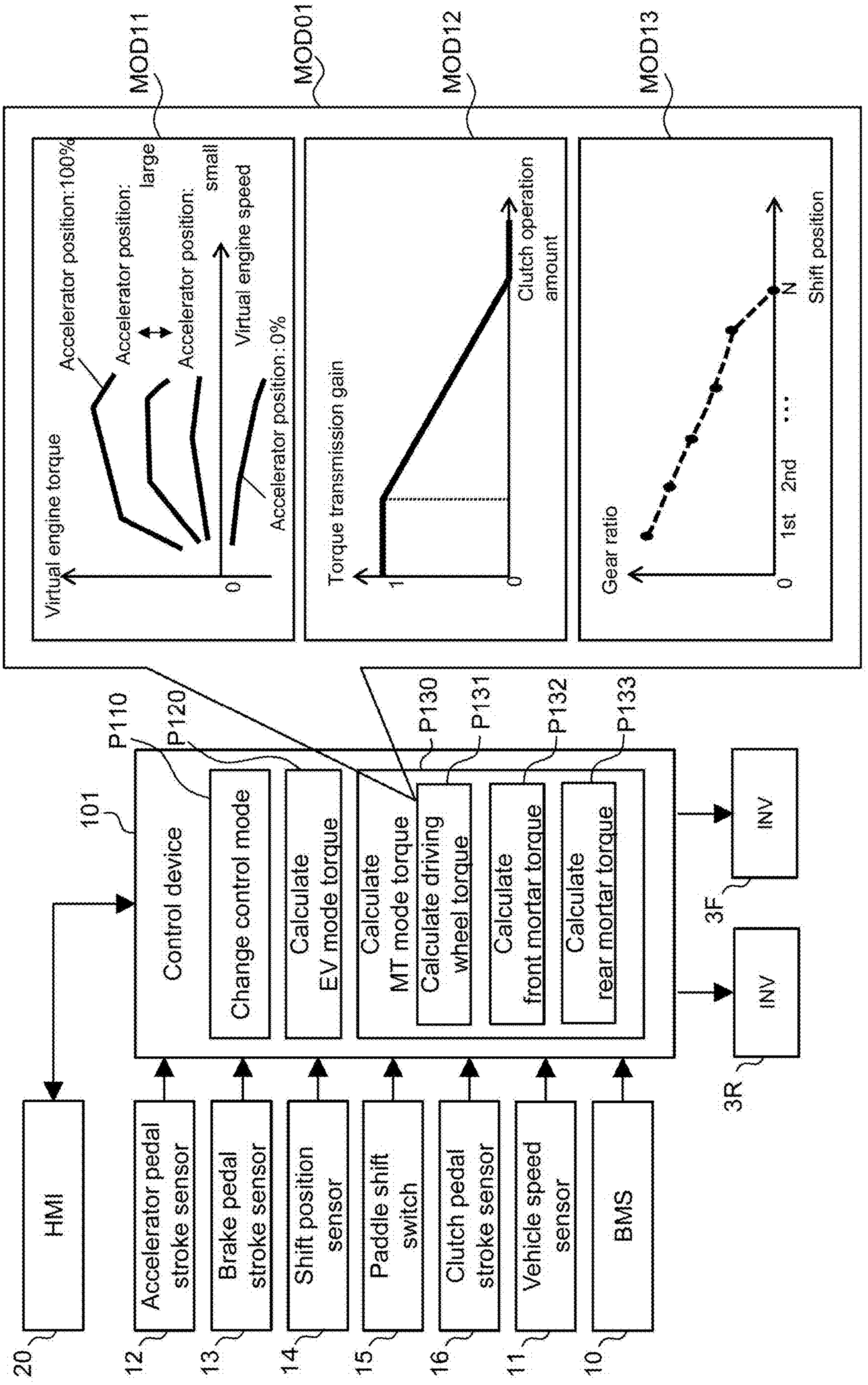
FIG. 2 is a diagram showing a configuration of a control device related to travel control of the electric vehicle.

FIG. 2 is a diagram showing a configuration of the control device 101 related to the travel control of the electric vehicle 100. More specifically, FIG. 2 shows a configuration particularly related to torque control in the travel control. The processor 102 functions as a travel control device by the processor 102 executing one or more programs 104 for the travel control stored in the memory 103.

A control mode signal is input from the HMI 20 to the control device 101 as a travel control device. The control mode signal includes information on the control mode selected by the driver. The control device 101 executes a process P110 based on the control mode signal. In the process P110, the control mode is switched according to the control mode signal. In the switching of the control mode, switching between the EV mode and the MT mode particularly affects the travel control.

When the control mode is switched to the EV mode, the control device 101 executes a process P120 for calculating torque in the EV mode. In the process P120, the control device 101 acquires the vehicle speed from the signal of the vehicle speed sensor 11 and acquires the accelerator position from the signal of the accelerator pedal stroke sensor 12. The control device 101 has a motor torque map having the accelerator position and the vehicle speed as parameters. The control device 101 inputs the vehicle speed and the accelerator position into the motor torque map and controls the inverters 4F and 4R such that the electric motors 3F and 3R generate the torque obtained by the motor torque map.

When the control mode is switched to the MT mode, the control device 101 executes a process P130 for torque calculation in the MT mode. The process P130 includes a process P131 for calculating the torque to be generated at the driving wheels. The process P130 includes a process P132 and a process P133. The process P132 is a process for calculating the torque to be generated in the front electric motor 4F, and the process P133 is a process for calculating the torque to be generated in the rear electric motor 4R. The process P132 and the process P133 are executed according to the driving wheel torque calculated in the process P130 and torque distribution between the front wheels 6F and the rear wheels 6R.

A vehicle model MOD01 is used for the calculation of the driving wheel torque in the process P131. The vehicle model MOD01 includes an engine model MOD11, a clutch model MOD12, and a transmission model MOD13. An engine, an clutch, and a transmission virtually realized by the vehicle model MOD01 is referred to as a virtual engine, a virtual clutch, and a virtual transmission, respectively. In the engine model MOD11, the virtual engine is modeled. In the clutch model MOD12, the virtual clutch is modeled. In the transmission model MOD13, the virtual transmission is modeled.

The engine model MOD11 calculates a virtual engine speed and virtual engine torque. The virtual engine speed is calculated from the vehicle speed, a total reduction ratio, and a slip ratio of the virtual clutch. The virtual engine torque is calculated from the virtual engine speed and the accelerator position. The vehicle speed is acquired from the signal of the vehicle speed sensor 11. The accelerator position is acquired from the signal of the accelerator pedal stroke sensor 12. The total reduction ratio is a value obtained by multiplying the gear ratio of the virtual transmission by a reduction ratio determined by a mechanical structure from the virtual transmission to the driving wheels. In the engine model MOD11, the relationship between the virtual engine speed and the virtual engine torque is defined for each accelerator position. The engine characteristics of the engine model MOD11 may be selectable by the driver through by the operation of the HMI 20.

The clutch model MOD12 calculates a torque transmission gain. The torque transmission gain is a gain for calculating a degree of torque transmission of the virtual clutch according to the clutch operation amount. When the clutch operation stick shift mode is selected as the shift mode, the clutch operation amount is acquired from the signal of the clutch pedal stroke sensor 16. The clutch operation amount is 0% at the start position of the dummy clutch pedal 26 and is 100% at the end position of the dummy clutch pedal 26. In the clutch model MOD12, the torque transmission gain is given to the clutch operation amount. The torque transmission gain is converted into the clutch torque capacity of the virtual clutch, that is, the virtual clutch torque capacity. Then, the virtual clutch torque input from the virtual clutch to the virtual transmission is calculated based on comparison between the virtual clutch torque capacity and the virtual engine torque calculated by the engine model MOD11. In the clutch model MOD12, a value obtained by subtracting the torque transmission gain from 1 is calculated as the slip ratio. The slip ratio is used for the calculation of the virtual engine speed in the engine model MOD11.

When the puddle shift mode is selected as the shift mode, the clutch operation amount input into the clutch model MOD12 is calculated using a clutch operation model. Further, even when the clutch operation-less stick shift mode is selected as the shift mode, the clutch operation amount input into the clutch model MOD12 is calculated using the clutch operation model. The clutch operation model is a model simulating clutch operation of a model driver. When the paddle shift mode is selected, the clutch operation model receives the vehicle speed, the virtual engine speed, and the signal from the paddle shift switch 15. When the clutch operation-less stick shift mode is selected, the clutch operation model receives the vehicle speed, the virtual engine speed, and the signal from the shift position sensor 14.

The signal from the paddle shift switch 15 and the signal from the shift position sensor 14 are used to count a timing of the clutch operation. When the gear shift operation of the driver is detected by the signal from the paddle shift switch 15 or the signal from the shift position sensor 14, the clutch operation amount is maximized in the clutch operation model so as to disengage the virtual clutch. The vehicle speed and the virtual engine speed are used for calculating the clutch operation amount. In the clutch operation model, the clutch operation amount is calculated based on a rotation speed difference between a rotation speed of an input shaft of the virtual transmission and the virtual engine speed such that the rotation speed of the input shaft of the virtual transmission calculated from the vehicle speed and the virtual engine speed smoothly coincide with each other.

The transmission model MOD13 calculates the virtual gear ratio. The virtual gear ratio is a gear ratio determined by a virtual shift position (virtual gear position) in the virtual transmission. The virtual gear ratio is set for each shift position. The maximum virtual gear ratio is set for a first position, and the virtual gear ratio is reduced in the order of a second position, a third position, a fourth position, and so on. In the stick shift mode, the shift position is associated with the signal of the shift position sensor 14 in a one to-one manner.

In the paddle shift mode, the shift position is shifted up by one in response to the upshift signal from the paddle shift switch 15 and the shift position is shifted down by one in response to the downshift signal from the paddle shift switch 15. The number of the shift positions is physically determined in the dummy H-type shifter 24, whereas the number of the shift positions is not physically limited in the dummy paddle shifter 25. Therefore, the transmission model MOD13 may be made different between the stick shift mode and the puddle shift mode, and the number of the shift positions in the puddle shift mode may be made larger than the number of the shift positions in the stick shift mode.

The transmission model MOD13 calculates virtual transmission torque using the virtual gear ratio and the virtual clutch torque. The virtual transmission torque is virtual torque output from the virtual transmission. The control device 101 controls the inverters 4F and 4R so as to change the torque outputted from the electric motors 3F and 3R in accordance with the virtual transmission torque. The virtual transmission torque changes discontinuously in accordance with switching the virtual gear ratio. Such discontinuous change in the virtual transmission torque causes a torque shock in the electric vehicle 100, and the electric vehicle 100 is made to look like a vehicle having a stepped transmission.

The vehicle model MOD01 calculates the driving wheel torque from the virtual transmission torque and the reduction gear ratio. The driving wheel torque is a total amount of torque applied to the right and left front wheels 6F and the right and left rear wheels 6R. The torque distribution to the front wheels 6F and the rear wheels 6R can be fixed or can be changed actively or passively. The torque distribution may be selectable by the driver, and when a mode for driving only the rear wheels is selected, the driving wheel torque is a total amount of torque applied to the right and left rear wheels 6R.

In the process P132, the torque of the front electric motor 4F (front motor torque) in the MT mode is calculated by multiplying the driving wheel torque calculated in the process P131 by the torque distribution ratio to the front wheels 6F and the reduction ratio from the output shaft of the front electric motor 4F to the front wheels 6F. The control device 101 controls the front inverters 3F such that the front electric motor 4F generates the front motor torques calculated in the process P132.

In the process P133, the torque of the rear electric motor 4R (rear motor torque) in the MT mode is calculated by multiplying the driving wheel torque calculated in the process P131 by the torque distribution ratio to the rear wheels 6R and the reduction ratio from the output shaft of the rear electric motor 4R to the rear wheels 6R. The control device 101 controls the rear inverter 3R such that the rear electric motor 4R generates the rear motor torque calculated in the process P133.

In the configuration shown in FIG. 2, the battery management system 10 and the brake pedal stroke sensor 13 are not necessarily required for the above-described travel control. However, when the switching of the control mode affects the SOC of the battery 2, the signal of the battery management system 10 may be used as information for determining whether the control mode is switched or not. When an operation method of the electric vehicle 100 greatly changes, such as when the control mode is switched between the EV mode and the MT mode, a condition that the brake pedal 23 is depressed may be set for switching the mode. In this case, the signal of the brake pedal stroke sensor 13 can be used as information for determining that the brake pedal 23 is depressed.

5. Sound Control of Electric Vehicle

The control device 101 may also perform sound control for controlling the sound emitted by the in-vehicle speaker 27. The processor 102 functions as a sound control device by the processor 102 executing one or more programs 104 for the sound control stored in the memory 103. The processor 102 which functions as the torque control device and the processor 102 which functions as the sound control device may be separate processors or the same processor.

The control device 101 as the sound control device can make artificially generated sound comes out from the in-vehicle speaker 27. One kind of the artificial sound is the fake engine sound, which simulates an engine sound of the transmission vehicle. When the control mode signal indicating that the MT mode is selected is input from the HMI 20, the control device 101 as the sound control device generates the fake engine sound based on the virtual engine torque and the virtual engine speed calculated in the process P131.

In a case where the driver can select the engine sound, the engine sound selected by the HMI 20 is used as a sound source of the fake engine sound reproduced from the in-vehicle speaker 27. However, the sound of the sound source is not used as it is, but a sound pressure of the engine sound is calculated such that the sound pressure increases as the virtual engine torque increases, and a frequency of the engine sound is calculated such that the frequency increases as the virtual engine speed increases. Then, for example, the sound pressure of the sound source is changed by the amplifier, and the frequency of the sound source is changed by the frequency modulator, and the fake engine sound is reproduced from the in-vehicle speaker 27. The virtual engine torque and the virtual engine speed change according to the accelerator operation, the gear shift operation, and the clutch operation by the driver. By changing the sound pressure and frequency of the fake engine sound in accordance with the virtual engine torque and the virtual engine speed which change in accordance with the operation of the driver, the driver can be given a sense of reality as if he or she is driving the actual transmission vehicle.

6. Notification of Timing of Gear Shift Operation (First Embodiment)

As described above, the driver of the electric vehicle 100 can experience the operation of the transmission vehicle in the electric vehicle 100 by operating the HMI 20 to switch the control mode to the MT mode. As one of the operations simulating the transmission vehicle, in the MT mode, the driver can manually perform the dummy gear shift operation (shift change) to switch the virtual shift position.

In a normal transmission vehicle, a timing of performing the gear shift operation is not explicitly notified. However, the driver can determine the timing of the gear shift operation from the vehicle speed, the engine speed, and the like. A concept of the timing of the gear shift operation is basically the same in the MT mode of the electric vehicle 100. That is, even if there is no explicit notification, the driver can determine the timing of the gear shift operation based on the vehicle speed, the virtual engine speed, and the like and can select a shift position that matches the state of the virtual transmission vehicle. However, it is more convenient for the driver if the timing of performing the gear shift operation is visually notified.

Therefore, the electric vehicle 100 notifies the driver of the timing suitable for the gear shift operation by display on the display device 21. Notification by the electric vehicle 100 will be described below.

Figure 3:
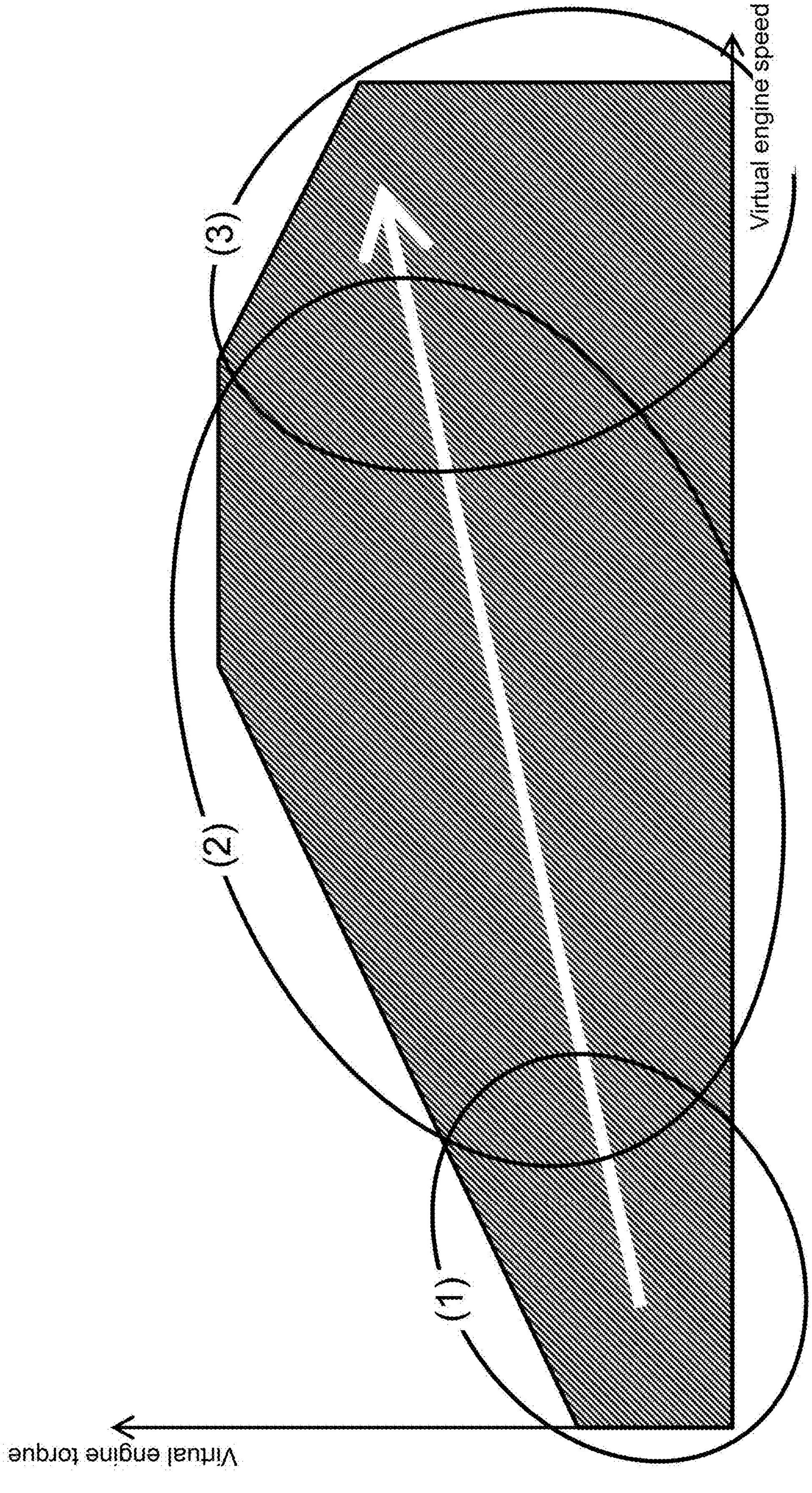
FIG. 3 is a graph showing a relationship between a virtual engine speed and virtual engine torque.

The timing of the gear shift operation can be considered based on how high or large the virtual engine speed and the virtual engine torque are. FIG. 3 is a graph showing a relationship between the virtual engine speed and maximum virtual engine torque. The maximum virtual engine torque to the virtual engine speed is determined by the vehicle model MOD01, and a hatched region is a region which the virtual engine torque can take.

In the hatched region, an ellipse (1) indicates a rough region where downshift is recommended, an ellipse (2) indicates a rough region where a shift position suitable for the state of the virtual transmission vehicle is selected, and an ellipse (3) indicates a rough region where upshift is recommended. It is considered that when the virtual engine speed and the virtual engine torque are in the region (1), the driver can comfortably drive the vehicle with large torque by downshifting, when they are in the region (2), the driver can drive the vehicle in a region where a sufficient torque can be used, and when they are in the region (3), the driver can comfortably drive the vehicle by upshifting because the region where the virtual engine torque can be obtained to the maximum is already passed.

A white arrow in the hatched region represent changes in the virtual engine speed and the virtual engine torque when the driver depresses the accelerator pedal 22 at a certain virtual shift position. The lower left side of the arrow is in the region where the driver can drive the vehicle more comfortably when the downshift is performed. When the accelerator pedal 22 is depressed from this position, the virtual engine speed and the virtual engine torque gradually increase and shift to the region where the current shift position is considered to be suitable. Thereafter, when the accelerator pedal 22 is further depressed and the virtual engine speed and the virtual engine torque further increase, the virtual engine speed and the virtual engine torque becomes in the region where the upshift is recommended.

The display device 21 displays an indicator that indicates the state of the change in the virtual engine speed and the virtual engine torque by the change in the length of the bar, and the timing at which the gear shift is recommended is notified by the change in the length of the bar.

Figure 4:
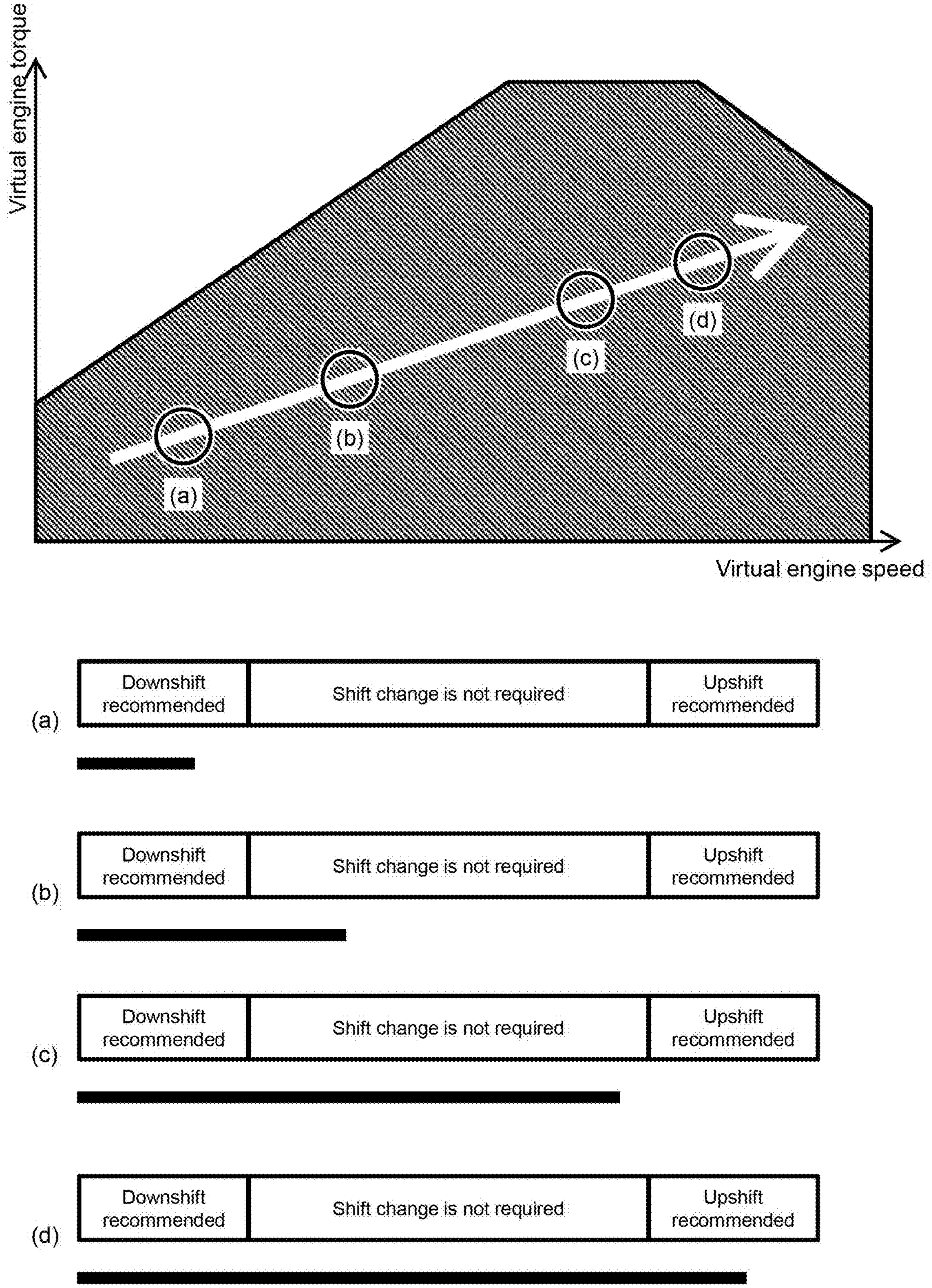
FIG. 4 is a diagram for explaining an indicator displayed by the electric vehicle according to the embodiment of the present disclosure.

FIG. 4 shows how the length of the bar changes in accordance with changes in the virtual engine speed and the virtual engine torque. The positions of (a) to (d) in the upper graph correspond to the indications of (a) to (d) in the lower graph, respectively. As shown in FIG. 4, the bar length is shortened when the virtual engine speed and the virtual engine torque are located at the lower left of the white arrow, and the bar length is gradually lengthened as the virtual engine speed and the virtual engine torque increase. The positions where the end position of the bar can exist are divided into three regions. The three regions are a downshift recommended region, where downshift is recommended, a region where the current shift position is recommended, and an upshift recommended region, where upshift is recommended. The timing of upshift is notified by the bar because the end position enters the upshift recommended region, and the timing of downshift is also notified by the bar because the end position enters the downshift recommended region.

In this way, the driver is visually notified of the timing at which the gear shift operation is recommended by the change in the length of the bar. The length of the bar continuously changes in accordance with the state of the virtual transmission vehicle reproduced in the MT mode. Therefore, the driver can know how much time is left until the virtual engine speed and the virtual engine torque reaches the region where the downshift or the upshift is recommended by the display, and thus can easily intuitively grasp the timing of the gear shift operation. In the example of FIG. 4, the current shift position is in the appropriate region in both the state of (b) and the state of (c), but it can be visually grasped that there is a margin until reaching the region where the upshift is recommended in the state of (b), whereas there is little margin in the state of (c). This is an effect that cannot be obtained by a device that notifies the timing of the gear shift operation only by single notification.

Although the virtual engine speed and the virtual engine torque do not necessarily change along the white arrows shown in FIGS. 3 and 4, the current virtual engine speed and virtual engine torque can be replaced with the length of the bar in the same manner even when the position representing the virtual engine speed and the virtual engine torque is not on the white arrow. The length of the bar can be used to predict how much margin is left until the upshift timing when the accelerator pedal 22 is depressed or how much margin is left until the downshift timing when the accelerator pedal 22 is released, based on the current virtual engine speed and virtual engine torque. Therefore, the length of the bar is determined according to where the virtual engine speed and the virtual engine torque are in the region, and the timing at which the gear shift operation is recommended can be notified by the continuously changing length of the bar.

Figure 5:
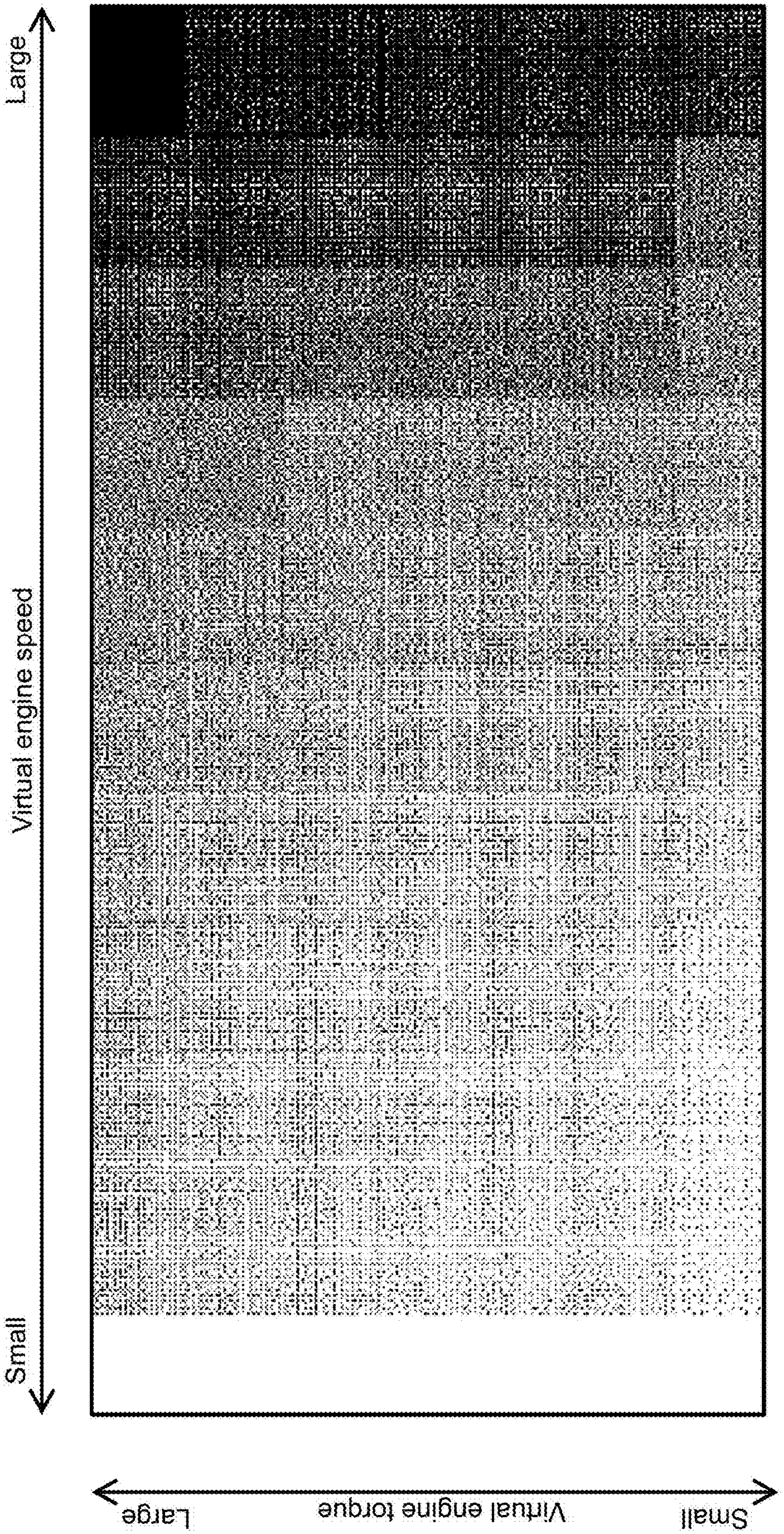
FIG. 5 is a diagram showing an example of a map for determining a length of a bar.

A method of calculating the length of the bar is described with reference to FIG. 5. FIG. 5 is a map showing the length of the bar corresponding to the virtual engine speed and the virtual engine torque. A color depth represents the length of the bar. The bar becomes shorter as the color become lighter, and the bar becomes longer as the color becomes darker. If the virtual engine speed is the same, the bar becomes longer as the virtual engine torque increases, and if the virtual engine torque is the same, the bar becomes longer as the virtual engine speed increases. In the map shown in FIG. 5, the values representing the magnitudes of the virtual engine speed and the virtual engine torque do not necessarily correspond to the values of the virtual engine speed and the virtual engine torque themselves calculated by the vehicle model MOD01. For example, the values of the virtual engine speed and the virtual engine torque may be replaced with scores, and the map may be set based on the scores. The map is prepared in advance and stored in the memory 103. The length of the bar is calculated from the values of the virtual engine speed and the virtual engine torque based on such a map.

7. Other Embodiments

7-1. Second Embodiment

The above is the basic embodiment. Various embodiments will be described below as modifications. In the second embodiment, the map for determining the length of the bar is variable according to the travel mode.

Figure 6:
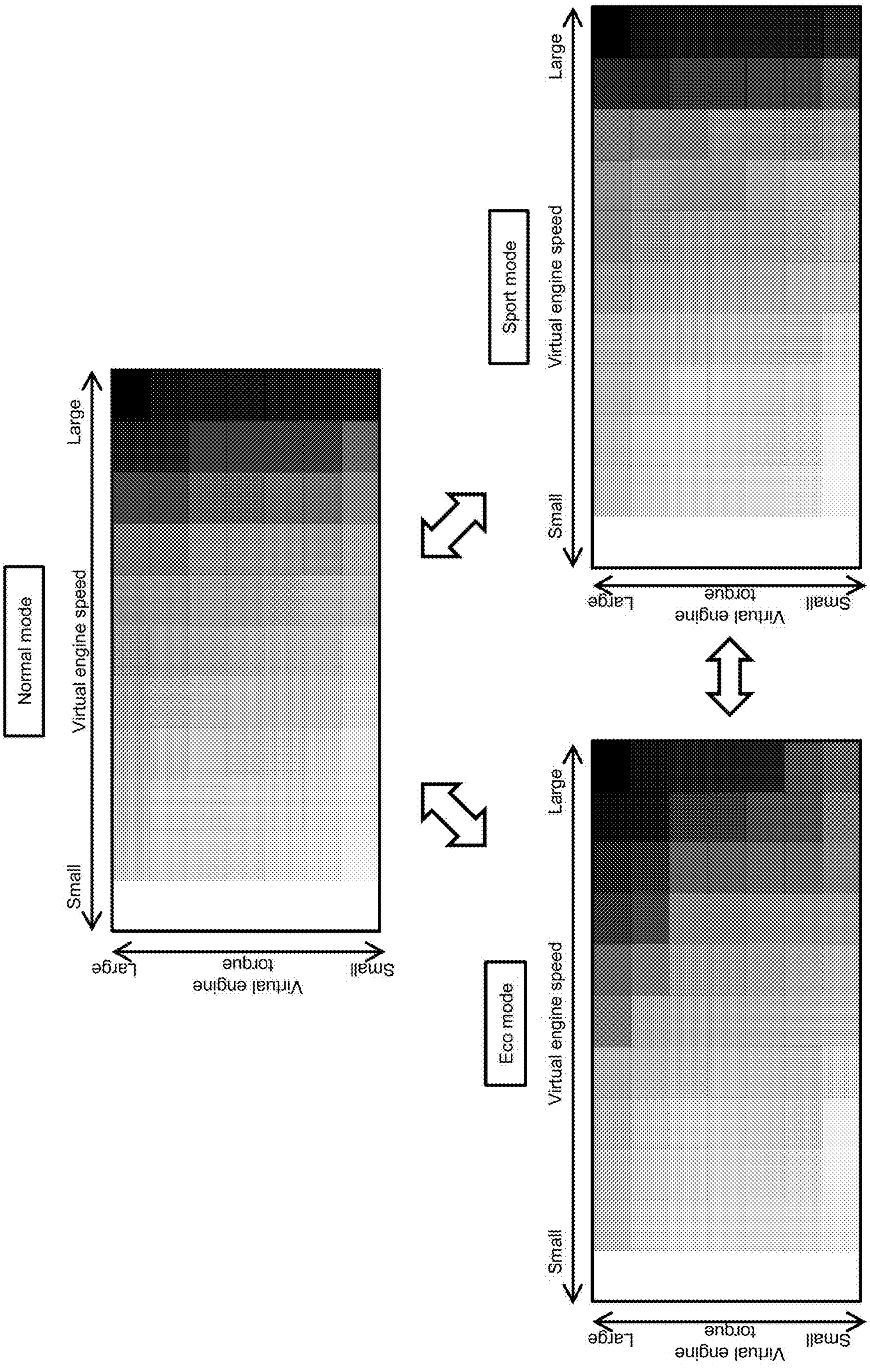
FIG. 6 is a diagram for explaining a change of a map according to a mode.

FIG. 6 shows three travel modes and examples of maps corresponding to the respective travel modes. The driver can select the travel mode from three modes, a normal mode, an eco mode, and a sport mode, and the upper map shows a map in the normal mode, the lower left map shows a map in the eco mode, and the lower right map shows a map in the sport mode. The map in the normal mode is a map corresponding to a standard shift change timing. In the eco mode, the length of the bar is increased from a region where the virtual engine torque is low, as compared with the normal mode. That is, a notification recommending upshift begins in a region of a relatively low virtual engine speed and virtual engine torque. By recommending the driver to upshift early in this way, output of the driving wheel torque can be suppressed, and consumption of the battery 2 can be suppressed. The sport mode is a mode for promoting so-called "pulling travel", and stretch of the bar when the virtual engine speed increases is suppressed as compared with the normal mode. That is, the timing of the upshift is delayed as compared with the normal mode.

In this way, the map is made variable in accordance with the travel mode, and thus the driver can be notified of the timing of the shift change in accordance with the driver's preference and situation. When the map is changed in accordance with the travel mode, the length of the bar set for the same virtual engine speed and virtual engine torque may be changed, or the method of calculating the score based on the virtual engine speed and the virtual engine torque may be changed. Further, the driver may be able to arbitrarily select each travel mode by operating the HMI 20. Alternatively, the travel mode may be automatically changed by the control device 101. For example, the control device 101 may acquire information from the battery management system 10 and automatically set the travel mode to the eco mode when the remaining battery level becomes low. The three travel modes described above are merely examples, and the number of the travel modes and the number of the maps corresponding thereto may be more or less than three, and the prepared maps are not limited to the maps shown in FIG. 6.

7-2. Third Embodiment

The third embodiment is a modification of the second embodiment. In the second embodiment, the timing at which the notification recommending the upshift or the downshift is made is variable according to the travel mode. In contrast, in the third embodiment, a rate of change in the bar length is variable depending on the travel mode.

For example, maps corresponding to respective two travel modes, a normal mode and a strong notification mode are prepared. The virtual engine speed and the virtual engine torque when the end position of the bar enters the downshift recommended region or the upshift recommended region are set to be equal in both maps. That is, the timing at which the notification recommending the downshift or the upshift is made is the same in both modes. However, in the strong notification mode, the rate of change in the length of the bar near the downshift recommended region or the upshift recommended region is increased. Since the length of the bar changes rapidly when the virtual engine speed and the virtual engine torque enters the region where the shift change is recommended, the driver can more easily visually recognize that the notification is being performed.

These two modes may be arbitrarily selected by the driver or may be automatically set by the control device 101. The third embodiment can be combined with the second embodiment. That is, both the timing at which the notification recommending the shift change is made and the change speed of the length of the bar in the vicinity of the upshift recommended region or the downshift recommended region may be variable depending on the travel mode.

7-3. Fourth Embodiment (Modification of Display Method)

Figure 7:
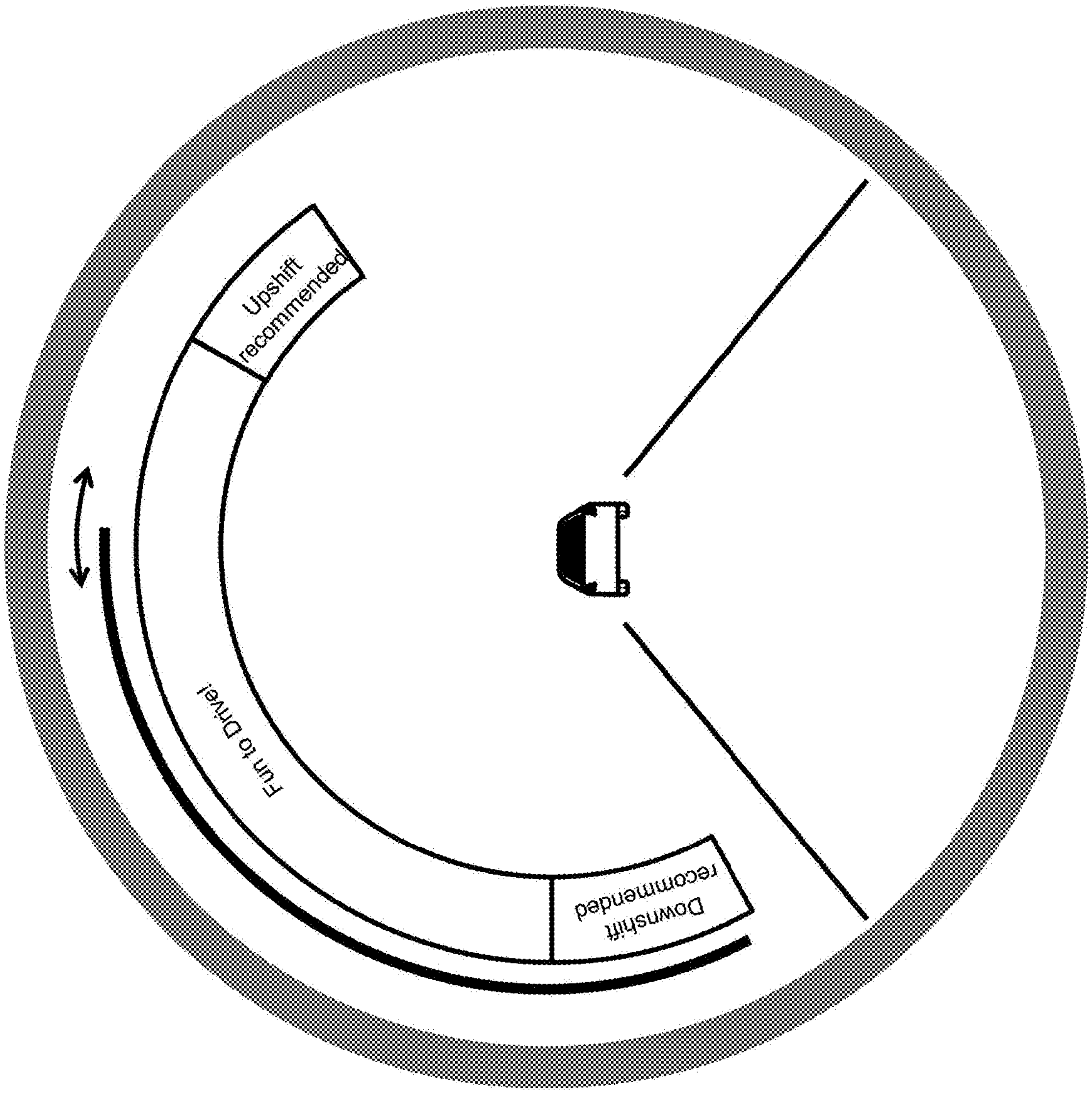
FIG. 7 is a diagram showing an example of display of an indicator.

The indicator displayed on the display device 21 is not limited to the indicator represented by a linear bar. FIG. 7 is a diagram showing an example of a method of displaying the bar. The bar may be a bar displayed in a curved shape in a circular display area.

In the indicator, the color of the bar may change with the change in the length of the bar. For example, the color of the bar may continuously change in accordance with the change in the length of the bar. Alternatively, the color of the bar may change in a stepwise manner in accordance with the end position of the bar entering the downshift recommended region or the upshift recommended region. Alternatively, when the end position of the bar enters the downshift recommended region or the upshift recommended region, the bar may be blinked in accordance with the change in color of the bar or instead of changing the color. By blinking or changing the color, the driver can more easily recognize that the virtual engine speed and the virtual engine torque enters the downshift recommended region or the upshift recommended region.

Figure 8:
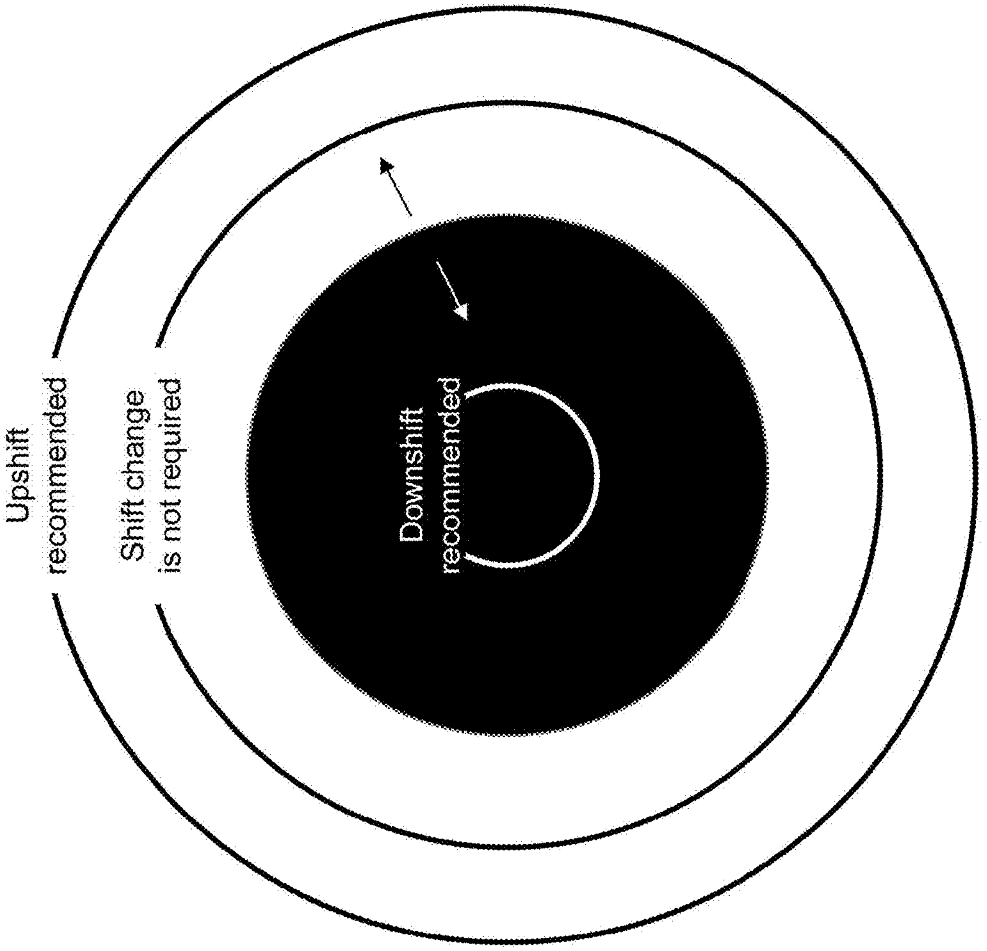
FIG. 8 is a diagram showing another example of display of the indicator.

The indicator may be an indicator displayed by something other than a bar. In the example of FIG. 8, the downshift recommended region, the upshift recommended region, and the region in which an appropriate shift position is selected are indicated by circular regions. The circular region filled in black is a region representing the current state of the virtual transmission vehicle, and the size thereof continuously changes in accordance with the change in the state of the virtual transmission vehicle. The display may be represented by the change in the area as described above.

As described above, the display method of the indicator is not limited as long as the driver can visually grasp a continuous change corresponding to the state of the virtual transmission vehicle. Examples of the indicator may include a display in which a numerical value, a color, an area of a figure, a length of a bar, or a combination thereof continuously changes. Even when a display other than the length of the bar is used as the indicator, the parameter to be displayed can be calculated using the map as shown in FIG. 5. For example, the area or the color can be defined by a map as shown in FIG. 5.

7-4. Fifth Embodiment (Divided Regions)

In the example of FIG. 4, the positions which the end of the bar can take are divided into three regions, i.e., the downshift recommended region, the upshift recommended region, and the region where the gear shift operation is not required. By dividing the region indicating the shift timing into the regions simply indicated by the three stages, the driver can easily and clearly recognize the shift timing.

Figure 9:
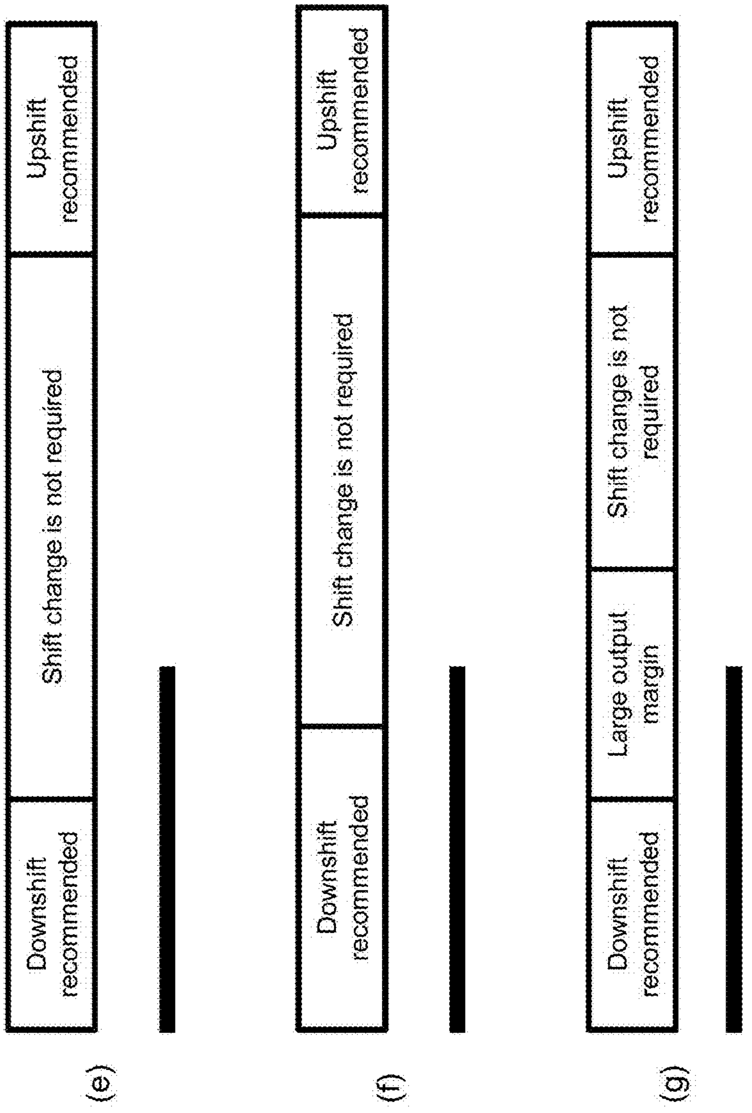
FIG. 9 is a diagram showing an example of changing display of the indicator.

The size of each of these three regions may be variable according to the selection of the driver. FIG. 9 shows an example of a method of dividing the region. Example (e) shows a method of dividing the region in the normal mode. On the other hand, example (f) is a method of dividing the region in a mode for a driver who wants to actively downshift. In the display example shown here, the downshift recommended region is made wider than in the normal mode, and the upshift recommended region is made narrower than in the normal mode. In this way, the size of each region may be variable.

In the display of the indicator, the positions that the end of the bar can take may be further divided into subdivided regions. For example, in the example (g), the region that the end position of the bar can take is divided into four regions, the downshift recommended region, a region with a large output margin, the region where traveling can be performed at an appropriate shift position, and the upshift recommended region. The region of “large output margin” is a region indicating that there is a margin to the region where the maximum virtual engine torque can be obtained and that there is a depression allowance of the accelerator pedal 22. In this region, it is possible to continue driving with the current virtual shift position or to downshift in order to achieve greater acceleration. By displaying such a region in addition to the downshift recommended region, it is possible to provide a guide to the driver who wants to actively downshift.

In this way, by displaying the subdivided regions by the indicator, the driver can grasp the state of the virtual transmission vehicle in more detail. The display of the indicator may be fixed to either the display divided into three regions or the display divided into more detailed regions, or may be switchable arbitrarily by the driver or automatically by the control device 101.

8. Summary

As described above, according to the electric vehicle of the present embodiment, the driver is notified of the timing at which the virtual shift position is recommended to be switched, by the continuously changing display. Since the display continuously changes in accordance with the state of the virtual transmission vehicle, the driver can visually and easily recognize the timing of the gear shift operation reproduced in the MT mode. Thus, the drivability can be improved. The above-described embodiments can be appropriately combined.

What is claimed is:

1. An electric vehicle having an electric motor as a drive source, comprising:
- an accelerator pedal used for driving the electric vehicle;
- a dummy gear shift operation member that simulates an operation member used for gear shift operation of a transmission vehicle;
- a display device for displaying information to a driver;
- a vehicle speed sensor configured to measure a vehicle speed of the electric vehicle; and
- a control device configured to control torque of the electric motor in accordance with operation of the accelerator pedal, wherein;
- the control device is configured to execute:
  - switching a relationship of the torque of the electric motor with respect to an operation amount of the accelerator pedal and the vehicle speed in accordance with operation of the dummy gear shift operation member, wherein the relationship of the torque of the electric motor with respect to the operation amount of the accelerator pedal and the vehicle speed is defined by a vehicle model that simulates a vehicle comprising an engine and a transmission, and wherein the torque of the electric motor is determined as a function of both the operation amount of the accelerator pedal and the vehicle speed simultaneously based on the vehicle model;
  - displaying an indicator on the display device, the indicator being an indicator with a bar whose length continuously changes in conjunction with driving wheel torque of the electric vehicle and the vehicle speed; and
  - notifying the driver of a timing at which downshift or upshift of the dummy gear shift operation member is recommended by a change in an end position of the bar.

2. The electric vehicle according to claim 1, wherein the indicator is displayed on a meter panel.

3. The electric vehicle according to claim 1, wherein the control device changes a relationship of the driving wheel torque and the vehicle speed with respect to the length of the bar according to selection by the driver.

4. The electric vehicle according to claim 3, wherein the control device controls displaying of the bar in according with a display mode, and the display mode includes a first mode and a second mode in which the length of the bar is changed such that the bar reaches a maximum length in a region of higher rotation speed than in the first mode.

5. The electric vehicle according to claim 3, wherein the control device controls displaying of the bar in according with a display mode, and the display mode includes a first mode and a third mode in which the length of the bar is changed such that the bar reaches a maximum length in a region of lower torque and a lower rotation speed than in the first mode.

6. The electric vehicle according to claim 1, wherein color of the bar changes when the end position of the bar enters a downshift recommended region or an upshift recommended region.

* * * * *